United States Patent Office 3,330,714
Patented July 11, 1967

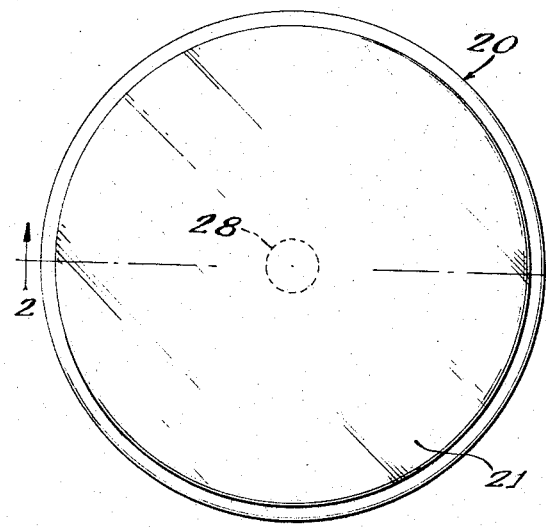
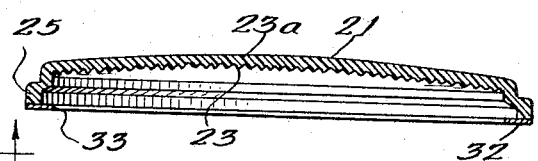
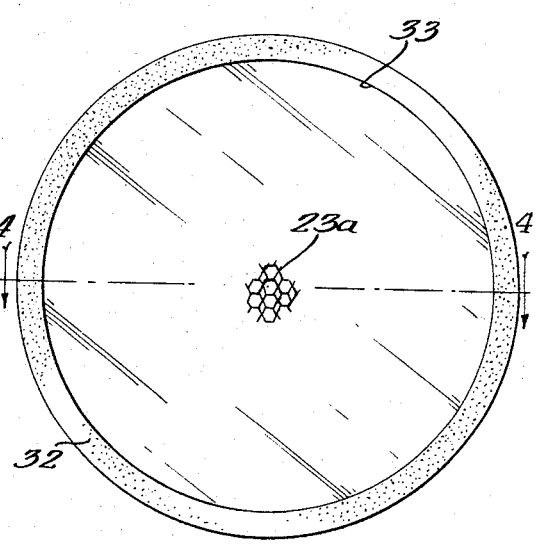
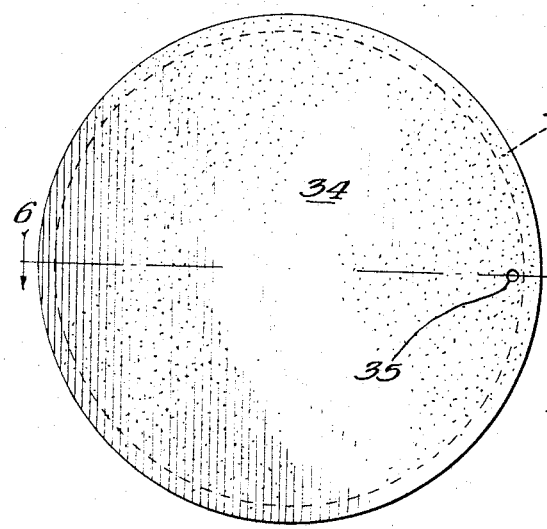
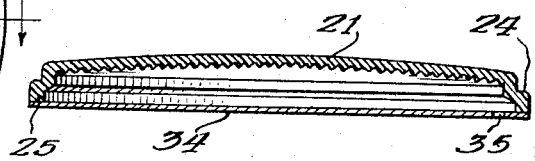

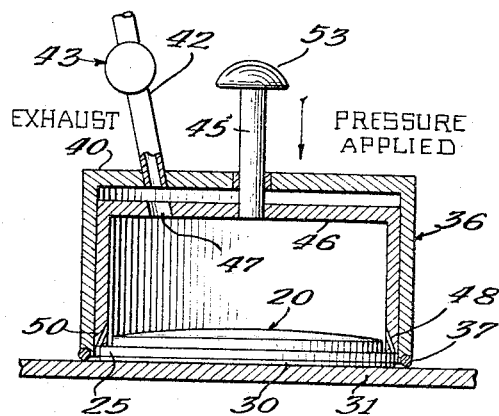
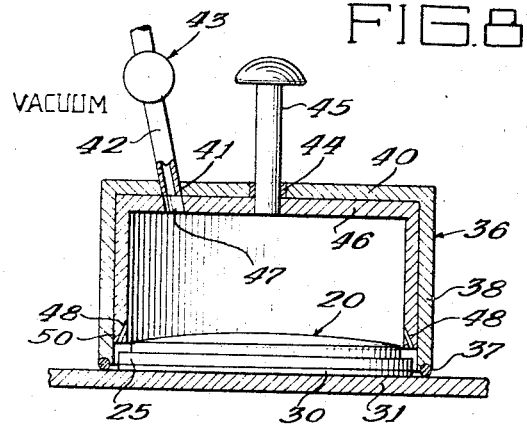
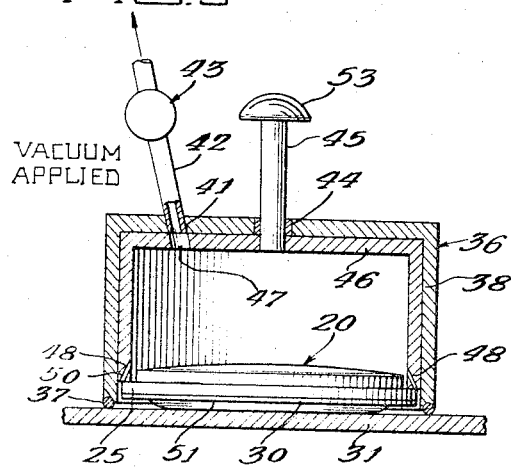
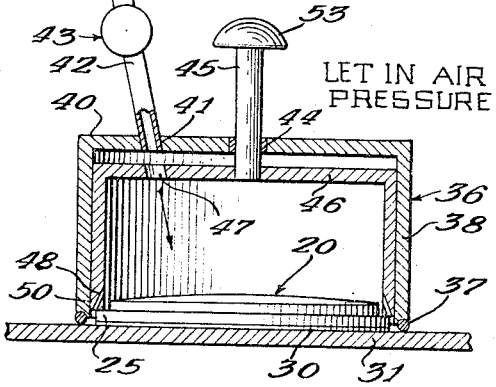
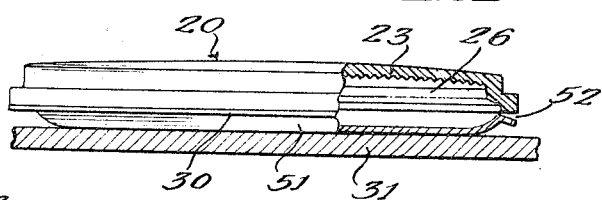
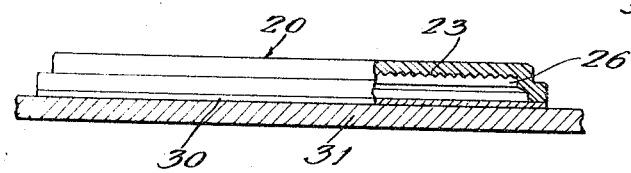

3,330,714
METHOD OF ADHERING ADHESIVE BACKED LIGHT REFLECTOR UNIT TO A MOUNTING SURFACE
Ralph R. Gunderson, c/o Vari-Products Co., 330 N. Harding, Chicago, Ill. 60624
Original application Mar. 8, 1962, Ser. No. 178,471, now Patent No. 3,266,371, dated Aug. 16, 1966. Divided and this application June 30, 1965, Ser. No. 468,472
6 Claims. (Cl. 156—286)

This application is a division of my copending application Ser. No. 178,471, filed Mar. 8, 1962, and entitled "Light Reflector Unit with an Undulatory Reflecting Insert," now U.S. Patent No. 3,266,371 granted Aug. 16, 1966.

This invention relates to light reflectors having adhesive backings, and to a method for adhering such reflectors to a mounting surface.

The light reflectors of the present invention are widely employed as warning reflectors for use in conjunction with vehicles traveling the highways. Heretofore, such reflectors have been mounted in seats in metal or plastic brackets which have in turn been secured to a vehicle mounting surface by cap screws or other mechanical means. Such installations have failed to provide a hermetic seal so that the reflecting and refracting surfaces of the reflector become dirty during use; and in addition, the assembly and attachment of the reflectors has been a time-consuming endeavor.

The primary object of this invention is to provide a novel method for securing such adhesive back reflectors to a mounting surface.

Yet another object is to provide a novel method for exhausting air from within a cavity of a reflective member when securing the reflective member to a mounting surface.

The invention is illustrative in a preferred embodiment in the accompanying drawings, in which:

FIG. 1 is a top plan view of a light reflector unit showing a spacer or stop member in dotted outline;

FIG. 2 is a sectional view as indicated on line 2—2 of FIG. 1 showing a central spacer element positioned between the adhesive backing and a metallic reflector insert within the cavity of the reflector and positioned immediately beneath the light reflecting and refracting facets of the inner face of the reflector unit;

FIG. 3 is a bottom plan view of a modified form of a reflector unit having a gasket-type adhesive backing;

FIG. 4 is a sectional view taken as indicated on line 4—4 of FIG. 3;

FIG. 5 is a bottom plan view of a second modification of the reflector unit showing an adhesive backing having a perforation near its periphery;

FIG. 6 is a sectional view taken on line 6—6 of FIG. 5;

FIGS. 7 through 11 illustrate diagrammatically the preferred method by which the above three embodiments of reflector units may be adhered to a mounting surface;

FIG. 7 being a side elevational view of the preferred form of reflector unit;

FIG. 8 being a diagrammatic sectional view showing the reflector unit positioned against the mounting surface with vacuum not yet applied to the chamber of the illustrated tool;

FIG. 9 being a view similar to FIG. 8 illustrating the inner chamber of the tool being evacuated so that the internal pressure within the cavity within the reflector unit pushes outwardly upon the adhesive backing of the reflector unit in bellows-like fashion to press the central portion of the adhesive backing firmly against the mounting surface;

FIG. 10 being a view similar to FIG. 9 with the central chamber of the tool still exhausted and showing the application of a force to a movable member within the chamber to apply pressure against the rim of the reflector unit forcing the entire face of the adhesive against the mounting surface; and FIG. 11 being a view similar to FIG. 10 but illustrating the release of the vacuum within the inner chamber of the tool perimtting air pressure to rush in and apply a compressive force to the entire exposed face of the reflector unit flattening the reflector unit and urging it radially;

FIG. 12 is an enlarged broken side elevational view partly in section of the reflector unit shown in FIG. 9, the view illlustrating the breaking away of the adhesive back from the rim of the reflector unit to permit the exhaust of air pressure from within the cavity of the reflector unit; and FIG. 13 is an enlarged broken side elevational view partly in section of the reflector of FIG. 11 to illustrate the deformation in the crown of the reflector unit by atmospheric pressure because of the exhausted condition of the hermetically sealed cavity within the reflector unit.

In the embodiment illustrated, and referring particularly to FIGS. 1 through 3, a light reflector unit, generally designated 20, is shown. The unit 20 preferably includes an integral reflective member 21 formed from a light-transmitting synthetic plastic. The material generally used is methyl methacrylate commonly sold under the trade name "Lucite." The reflective member 21 includes a light-receiving face 22 and a reverse or rear face 23 containing a plurality of refracting and reflecting prismatic surfaces 23a for receiving incoming light and causing said light to be redirected generally along its incoming path. The reflective member 21 may be circularly formed, and it is preferably provided with a rearwardly extending annular wall 24 terminating in a peripheral rim or lip 25 which wall 24 and rim 25 afford an inner cavity 26.

As best shown in FIG. 2, it is preferred that an annular reflecting insert 27 be positioned within the cavity 26 to receive and give additional reflection to incident light. The reflecting insert 27 is preferably formed of aluminum foil and may have a ruffled forward face which when reflecting incident light provides a brightened or "live" appearance to portions of the front face of the reflective member 21. The wrinkled appearance of the insert 27 is illustrated by the wavy lines shown in the sectional view, FIG. 2.

A stop member 28 is also preferably placed within the cavity 26 between a backing member 30 and the reflecting insert 27. As will be subsequently explained, the stop member 28 is generally a thickened slug of metal centrally disposed in the cavity 26 for the purpose of bearing between a mounting surface such as illustrated at 31 in FIG. 13 and the rear face 23 of the reflective member 21. It will be noted in FIG. 2 that there is a slight clearance between the insert 28 and the face 23 but since the reflective member is resiliently deformable under pressure, the rear face 23 will be brought to bear upon the insert 28 when the reflector unit is adhered to a mounting surface.

The backing member 30 is also best seen in FIG. 2. The backing member is preferably formed of a thin plastic or of durable paper material which is provided with a pressure-sensitive adhesive on each of its opposite faces. Its inner face is adhered peripherally to the rim 25 of the reflective member 21. Its outer face prior to use is covered by a protective paper material adhered in place by the pressure-sensitive adhesive on the outer face. The adhesive on the inner face in this form of the invention has adhering qualities which cause it to be secured firmly to the rim 25 of the reflective unit 21. Its adhering qualities are also of such nature as to permit the peripheral separation, that is, the adhesive will break away from the peripheral reflector rim when the differential between the air pressure within the cavity 26 and the ambient air pressure about the reflector unit approximates 25" of mercury.

A modification of another embodiment of a light reflector unit of this invention is illustrated in FIG. 3 and FIG. 4. The reflective member 21 may be formed similarly to that shown in FIGS. 1 and 2. The chief difference in this modification is that a gasket-type backing member 32 is provided which is again adhered on its inner face to the annular rim 25. The outer face of the backing member 32, as shown in FIG. 3, provides a peripheral adherence of the backing member to a mounting surface 31. The purpose of the annular or gasket-type backing member 32 will be made more apparent on considering the method of adhering this type of reflector unit to a mounting surface. However, briefly, the enlarged opening 33 in the backing member 32 plays a part in exhausting the inner cavity 26 of the reflective member 21 as the reflector unit 20 is being adhered to a mounting surface.

Another embodiment of a reflector unit of this invention is shown in FIGS. 5 and 6. The structure of this embodiment may be formed in the same manner as that in FIGS. 1 and 2. The only difference in structure lies in a perforated backing member 34. As shown in FIG. 5 and in FIG. 6, the backing member is preferably provided with one or more perforations 35 positioned near the periphery of the backing member 34 and just inside the rim 25 so as to communicate with the inner cavity 26. Again, the purpose of the perforations will be made more apparent subsequently, in discussing the method of application of the reflector units, and it is sufficient here to say that the perforation 35 plays a part in exhausting the inner cavity 26 of the reflector unit as the reflector unit is being adhered to the mounting surface.

It is contemplated in each of the three forms of the reflector unit shown in FIGS. 1 through 6 that the reflective members 21 and the backing members 30, 32 and 34 may be formed and handled separately. That is, the reflecting members and their backing members may be packed and shipped separately by a manufacturer and then simply be assembly together as a unit at the time of adherence to a mounting surface. The double-faced adhesive of the backing members 30, 32 and 34 (when packed separately) is protected from adherence to other objects by paper-covering material on each of its faces.

The unique method of adhering the reflector unit 20 shown in FIGS. 1 and 2 to a mounting surface 31 is diagrammatically illustrated in FIGS. 7 through 11. FIG. 7 illustrates the reflector unit 20 with the backing member 30 adhered thereto and with the adhesive face of the backing member 30 exposed.

FIG. 8 shows diagrammatically a type of tool for adhering the reflector unit 20 to a mounting surface. The tool may include a vacuum bell or cup-shaped housing 36 which has a resilient annular seal 37 protruding from the end of its side wall 38 to make an air-tight seal against a mounting surface 31. The housing is provided with a bottom wall 40 which may be apertured at 41 to accommodate a vacuum hose 42 secured therein and connected to a source of vacuum indicated generally at 43.

The bottom wall 40 may also be provided with a bushing 44 which makes a substantially air-tight sliding fit about a shank 45. The end of the shank 45 may be secured to a cup-shaped plunger 46 adapted to make a close sliding fit within the side walls 38. The plunger 46 preferably has an opening 47 which permits air to be pulled from within the vacuum bell 36 through the vacuum line 42 when desired to evacuate the housing 36. A number of bleeder lines or passages 48 may be formed in the annular lip portion 50 of the plunger 46 for a purpose which will subsequently be made more apparent.

When it is desired to adhere a reflector unit 20 to a mounting surface 31, the unit 20 is first placed within the open end of the housing 36, as shown in FIG. 8, so that the annular rim 25 rests adjacent the annular lip portion 50 of the plunger 36. In practice, the reflector adhering gun or tool is tipped so that the housing opens upwardly, and the reflector unit 20 is simply dropped into place with the rim 25 resting upon the lip portion 50. The housing 36 is, of course, shaped to accommodate the particular shape of the reflector unit which is to be adhered. After the reflector unit 20 is dropped into place against the lip portion 48, a vacuum is applied (see FIG. 9) to exhaust air from the interior of the housing 36 and plunger 46. The evacuation of the housing 36 will cause the ambient air pressure to which the unit 20 is subjected to hold the reflector unit 20 in firm contact against the lip portion 50. This is true even though at this time the small bleeder lines 48 are open to atmospheric pressure and are permitting air pressure to enter in small quantities into the evacuated chamber within the housing 36.

In FIG. 9, the housing 36 has been pressed against a mounting surface 31 so that the annular seal 37 provides an air-tight fit. As the interior of the housing 36 continues to be exhausted under these conditions, the bleeder lines 48 also permit evacuation of the air pressure from between the adhesive face of the reflector unit 20 and the exhausted face of the mounting surface. Because of the great decrease in atmospheric pressure within the housing 36, the atmospheric pressure within the cavity 26 of the reflector unit 20 causes the flexible adhesive backing member 30 to bellow outwardly as at 51 so that the entire central portion of the flexible adhesive backing 30 is urged by the internal air pressure within the cavity 26 of the reflector unit 20 into firm and intimate adhering contact with the mounting surface 31.

In the practical application of this method, the interior of the housing 36 is exhausted almost immediately so that the flexible backing member 30 instantly bellows outwardly into adhering engagement with the mounting surface 31. Concomitantly therewith, or an instant of time later, the internal air pressure within the cavity 26 of the reflector unit 20 causes separation of a peripheral portion of the adhered backing member 30 with the annular rim 25, the separation being indicated at 52 in FIG. 12.

At this time, the cavity 26 of the reflector unit 20 and the entire interior of the housing 36 is exhausted, or at least is at extremely low air pressure. It has been found that the type of adhesive currently in use on backing members 30 displays such adhering qualities with the narrow Lucite rim 25 of the reflective member 21 that the adhesive will separate, as at 52, when the pressure differential between the interior of the reflector unit 20 and the interior of the housing 36 is approximately 25″ of mercury. This condition has been found to prevail when using reflecting members 21 approximately 3¼″ diameter and with a ⁹⁄₁₆″ cavity depth. Of course, the pressure differential required will vary with the flexibility of the backing member 30 and with the particular adhering qualities of the adhesive used. These factors may be readily adjusted with any particular size of reflector unit with which this method is employed.

FIG. 10 illustrates the next step of the preferred method. It will be recalled that in FIG. 9 the backing member 30 is bellowed outwardly against the mounting surface 31. Now in FIG. 10, a force is applied to the handle 53 in the direction of the arrow to drive the shank 45 and the plunger 46 downwardly against the annular rim 25. This movement reseals any separations 52 between the backing member 30 and the rim 25, and in addition, it causes the entire backing member to be urged into intimate contact with the mounting surface 31. It will be recalled that this sealing of the backing member 30 against the mounting surface 31 is being done in a vacuum so that practically no air pressure is trapped between the backing member 30 and the mounting surface 31 and a tremendously effective seal is provided throughout the area of adherence between the backing member and the mounting surface.

FIG. 11 illustrates the next step of the preferred method. Immediately after pushing the plunger 46 against the annular rim 25 of the reflective member 21, the vacuum line 42 is opened to the ambient air pressure. The inrushing air pressure strikes the entire front face 22 of the reflective member 21 a substantial blow and with substantial force. As stated earlier, the reflective member 21 is preferably resiliently deformable, and the inrushing air pressure actually pushes the crown of the front face 22 from a position as indicated in FIGS. 7 and 10 to a position as indicated in FIG. 11. In other words, the height of the crown of the front face 22 is greatly diminished. This downward pressure upon the crown of the front face 22 causes a slight radial spreading of the reflective member 21.

It has been shown in practice that this sudden application of a force by air pressure and the deformation of the reflective member 21 upon its adhering backing member 30 greatly improves the strength of adherence of the reflector unit 20 to a mounting surface. The precise reason for the improvement in the degree of adherence is not known. However, it is believed that the radial deformation of the reflective member 21 tends to place the backing member 30 in tension, and in so doing, causes the backing member 30 to be slightly moved into firmer and more intimate contact with the mounting surface.

After forcing the reflector unit 20 down with the force of the air pressure (FIG. 11), the reflector gun or tool may be removed for a subsequent operation. The reflector unit 20 as finally adhered to a mounting surface is shown in FIG. 13. It will be recalled that its inner cavity 26 is now substantially exhausted of air pressure so that the entire exposed area of the reflective member 21 is being urged toward the mounting surface 31 by a force of air pressure equal to approximately 12 to 14 lbs. per square inch. Thus, even at altitudes of 10,000 to 15,000 feet, the force of the air pressure is assisting and holding the reflector unit 20 in place. It is contemplated in the reflector unit shown in FIG. 13 that it may include a stop member 28 such as is shown in FIG. 2 to control the amount of deformation imparted to the front face 22 of the reflective member 21.

Tests have been conducted which illustrate the highly successful adherence of reflector units by utilizing the method of the present invention. For example, in one instance, a reflector unit was adhered to a sheet metal mounting surface by the method of this invention, and the reflector unit and the mounting surface were subjected to a temperature condition of −10° F. An eight pound weight was then dropped from a height of three feet upon the back of the mounting surface opposite the reflector unit. The force of the blow of the eight pound weight caused a deformation in the sheet metal backing and in the body of the resilient reflector unit, but the adherence of the bond between the reflector unit and the sheet metal mounting surface remained completely intact.

A similar test was conducted under a temperature condition of 186° F. Again, the sheet metal surface and the reflector unit were deformed by the force of the blow of the eight pound weight, but the reflector unit remained firmly adhered to its mounting surface.

The method described above can also be used with the reflector unit shown in FIGS. 3 and 4 which has the gasket-type backing member 32. With this type of backing member, and with the reflector unit being held against the lip portion 50 of the plunger 46, it is contemplated that the inner cavity 26 of the reflector unit will be exhausted at the same time as the interior of the housing 36. The access to the inner cavity 26 is simply provided through the enlarged opening 33 of the gasket-type backing member 32 which does not come down into firm engagement with a mounting surface until pressure is applied by the plunger 36, as is illustrated in FIG. 10. Otherwise, the method with the reflector unit having a gasket-type backing member 32 is the same as was previously described in relation to the unit for the backing member 30.

Reflector units utilizing perforated backing members 34 may also be adhered to a mounting surface by using the above disclosed method. Again, the only difference from the method described in respect to the backing member 30 lies in the manner in which the inner cavity 26 of the reflector unit 20 is evacuated Since the backing member has a small perforation 35 near its edge, the interior of the reflector unit 20 is exhausted through this perforation, then through the bleeder lines 48 and finally through the vacuum line 42. Generally, the perforation is sufficiently small so that the backing member 32 bellows outwardly into contact with the mounting surface 31 by exhausting the interior of the housing 36 as described above in relation to the backing member 30. In all other respects, the adherence of a reflector unit 20 having a perforated backing member 34 is similar to that above described in respect to reflector units having the backing member 30.

The foregoing detailed description is given for clearness of understanding only and no unnecessary limitations are to be understood therefrom, as some modifications will be obvious to those skilled in the art.

I claim:

1. The method of adhering to a mounting surface a light reflector unit having an inner cavity in its rear face, said method comprising positioning the reflector unit adjacent the mounting surface, placing an air-tight enclosure against the mounting surface and about the reflector unit, exhausting air pressure from within the enclosure and from within the cavity in the rear face of the reflector unit, and forcing the reflector unit against the mounting surface to adhere the rear face of the reflector unit to the mounting surface with the cavity being substantially evacuated of air pressure.

2. The method of adhering to a mounting surface a light reflector unit having a rim portion forming a rearwardly opening cavity and an adhesive backing member covering said cavity and adhered to said rim, said method comprising positioning an exposed adhesive face of the backing member adjacent the mounting surface, placing an air-tight enclosure about the reflector unit, exhausting air pressure from within the enclosure so that the air under pressure within the cavity of the reflector unit forces a portion of the adhesive backing member away from the rim of the reflector to permit air pressure to be exhausted from within the cavity, and forcing the reflector unit and its adhesive backing member against the mounting surface to re-adhere the backing member to the rim of the reflector unit and to adhere the exposed adhesive face of the backing member to the mounting surface and thereby to retain the cavity substantially evacuated of air pressure.

3. The method of adhering to a mounting surface a light reflector unit having an inner cavity opening rearwardly of the unit, said method comprising positioning the front face of the reflector unit against stop means within a vacuum chamber housing so that the ambient air pressure holds the unit against the stop means, positioning the housing against a mounting surface so that the housing forms with the mounting surface an air tight enclosure about the reflector unit, exhausting air pressure from within the enclosure and from within the cavity in the reflector unit, and forcing the reflector unit against the mounting surface to adhere the rear face of the reflector unit to the mounting surface.

4. The method of adhering to a mounting surface a light reflector unit having a cavity in its rear face, said method comprising positioning the light reflector unit adjacent the mounting surface, placing an air tight enclosure about the reflector unit, exhausting the air from within the enclosure about the reflector unit and from the cavity in the reflector unit, forcing the reflector unit against the mounting surface to adhere the reflector unit to said surface, and admitting air at the ambient pressure into the enclosure and against the reflector unit to secure the reflector unit to the mounting surface under the action of such ambient air pressure.

5. The method of adhering to a mounting surface a light reflector unit having a cavity in its rear face and an adhesive backing member releasably secured to the rear face of said reflector unit and covering said cavity to confine air in said cavity, said method comprising positioning the adhesive face of the backing member of the light reflector unit adjacent to the mounting surface, placing an air-tight enclosure about the reflector unit and against the mounting surface, exhausting the air from within the enclosure and from between the adhesive backing member of the mounting surface and to release the backing member from the rear face of the reflector unit whereby to exhaust the air from the cavity in the reflector unit, forcing the reflector unit against the mounting surface to adhere the adhesive backing member to said surface, and admitting air at the ambient pressure into the enclosure and against the reflector unit to press the reflector unit and the backing member against the mounting surface.

6. The method of adhering to a mounting surface a light reflector unit having an internal cavity opening in the rear face of the unit and a flexible adhesive backing member releasably secured to said rear face and closing said cavity, said method comprising positioning the adhesive face of the flexible backing member of the reflector unit adjacent to the mounting surface, placing an air tight enclosure about the reflector unit, exhausting the air pressure from the enclosure to permit the air within the cavity of the reflector unit to force the flexible backing member to bellow outwardly into adhering contact with the mounting surface and into cavity opening position to release the air within said cavity, forcing the reflector unit against the mounting surface to flatten the backing member into complete adhering contact with the mounting surface and into cavity closing position, and admitting air under ambient pressure into the exhausted enclosure and against the front face of the light reflector unit to secure said unit to the mounting surface under the action of such ambient air pressure.

References Cited
UNITED STATES PATENTS

| | | | |
|---|---|---|---|
| 711,212 | 10/1902 | Honiss | 53—103 |
| 2,184,824 | 12/1939 | Von Hofe | 156—285 |
| 2,657,847 | 11/1953 | Heitmann | 53—103 X |
| 2,690,593 | 10/1954 | Abercombie | 53—112 |
| 2,968,460 | 1/1961 | Van Dusen | 248—206 |
| 3,134,208 | 5/1964 | Richmond | 269—21 X |
| 3,224,106 | 12/1965 | Way | 269—21 X |
| 3,282,763 | 11/1966 | Gunderson | 156—382 X |

EARL M. BERGERT, *Primary Examiner.*

HAROLD ANSHER, *Examiner.*